Nov. 13, 1945.  W. MESSINGER  2,388,925
SEALING DEVICE
Filed Dec. 16, 1942
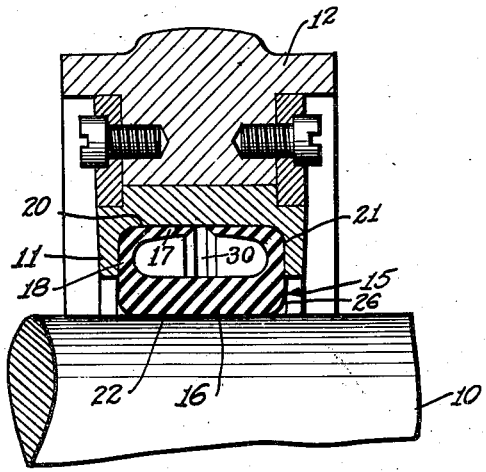
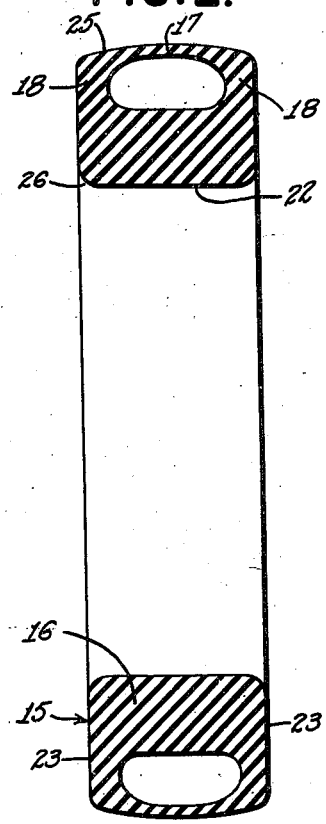
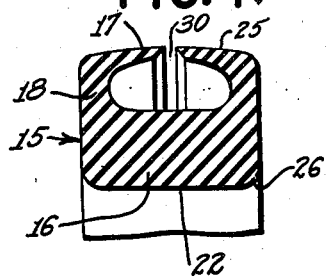
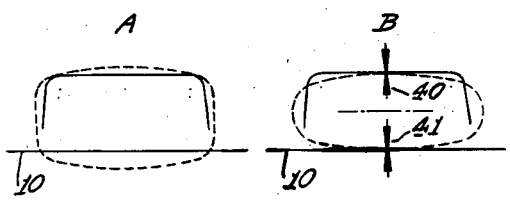
INVENTOR.
WILLIAM MESSINGER
BY Joseph H. Lipschutz
ATTORNEY Patented Nov. 13, 1945

2,388,925

UNITED STATES PATENT OFFICE 2,388,925

SEALING DEVICE

William Messinger, Philadelphia, Pa.

Application December 16, 1942, Serial No. 469,178

1 Claim. (Cl. 286—5)

This invention relates to sealing devices of the type which are adapted to engage a rotating member and form a packing which will not permit undesirable substances such as fluids or grease either to enter or leave compartments on one side or the other of the sealing member. Thus, for instance, it may be desired to protect the bearings which support the rotating member from the material which is being worked or rolled; or it may be desired to prevent water or other injurious substances from entering the bearing compartment while at the same time preventing the loss of lubricant from the compartment. Such sealing devices must be flexible to permit vibrations of the shaft to be taken up and at the same time provide effective sealing means between the rotating element and the device and between the sealing device and the bearing casing in which it is housed. Thus at all times the sealing device is effective at its inner and outer surfaces to provide an effective closure in spite of relative movements between the shaft and the bearing casing.

Various types of sealing devices have heretofore been proposed, but according to the present invention I provide a sealing device which may be formed of flexible material cast in a mold as a single, tubular, hollow member having inner, outer, and side walls all formed in predetermined shape and of relative thicknesses so that each wall performs its special individual function. At the same time, the walls of the seal are so designed that they contribute toward the unitary end of yielding the maximum sealing pressures at both the inner and outer surfaces.

It is an additional object of this invention to provide a sealing device of the type described above which is designed to be positioned in the area between a bearing casing and a rotating element. The cross-sectional area of the sealing device is made of predetermined larger area than that between the bearing casing and the rotating element, so that insertion of the sealing device will cause compression of the sealing device in such directions as to transmit the forces to the inner and outer walls to yield more effective sealing.

It is an additional object of this invention to provide a sealing device of the type described wherein the side walls are substantially plane surfaces in perpendicular relation with the inner wall so that the device may be fed into the opening in the bearing casing.

It is an additional object of this invention to provide a sealing device in the form of a hollow tubular member which may be provided on its periphery with apertures designed to cooperate with inlets through the bearing casing to permit fluid pressure to be applied to the interior of the sealing device for more effective sealing.

This application is a continuation in part of my copending application Serial No. 331,709, filed April 26, 1940, now abandoned.

Further objects and advantages of this invention will become apparent in the following detailed description thereof.

In the accompanying drawing,

Fig. 1 is a vertical section through the sealing device showing its relationship with respect to the bearing casing and the rotating element.

Fig. 2 is an enlarged section through the sealing device without peripheral aperture.

Fig. 3 comprises a series of three diagrammatic sketches showing the theory of operation of the device.

Fig. 4 shows the tubular member of Fig. 1 removed from the casing.

Referring to the drawing, there is shown a rotating element 10, which may be a shaft of any type, rotating within an opening in an annular casing 11 fixed within a housing 12. The casing 11 may be substantially U-shaped in section with the arms of the U extending toward the rotating element 10 and thus forming an annular channel within which the packing member or sealing device 15 is adapted to be positioned.

The sealing device 15 may take the form of a flexible, annular, hollow tube which may be cast in a mold and may comprise an inner wall 16, an outer wall 17, and side walls 18. The outer wall 17 is designed to rest against the outer wall 20 of the bearing casing 11 while the side walls 18 are designed to rest against the side walls 21 of the bearing casing. The inner wall 16 of the sealing device is designed to engage the rotating element 10. Therefore the inside surface 22 of the sealing device is molded as a cylindrical surface adapted to engage the surface of the shaft 10. The sides 18 have outer plane surfaces 23, preferably perpendicularly disposed with respect to surface 22. By so disposing planes 23 with respect to surface 22 the interior of casing 11 need not be bored with any special angle with respect to the plane of the base 20, which would be the case if planes 23 had a sloping angle with respect to base 22, and which would require special machining. The surface 25 of the outer wall 17 may be slightly curved outwardly. The intersections 26 between the plane surfaces 23 and the cylindrical surface 22 are radius-rounded to permit easy movement of the shaft relative to the seal and to permit the seal to ride over shoulders and other obstructions without damage.

The total area bounded by walls 22, 23 and 25, that is, the total cross-sectional area of the sealing device 15, is normally somewhat greater than the total area bounded by the interior of the bearing casing and the rotating element 10. This is shown in diagram 3A. The effect of inserting the larger cross-sectional area of sealing device 15 between the bearing casing 11 and the rotating element is shown in diagrams 3B and 3C. The effect of the lesser radial distance between wall 20 and the rotating element would normally tend to bow the side walls of the sealing device outwardly, but this outward movement is prevented by the side walls 21 of the bearing casing. As shown by the arrows 40 and 41 in Fig. 3B, the lesser radial distance between the casing wall 20 and the rotating element 10 produces forces between the outer wall 17 of the sealing device and the outer wall 20 of the casing on the one hand, and between the inner wall 16 of the sealing device and the rotating element 10 on the other. This tends to effect sealing at the outer and inner meeting surfaces, which is, of course, the desired result. Further, the compression of the side walls 18 of the sealing device, by reason of the fact that the side walls 21 of the bearing casing will not permit the side walls of the sealing device to bow outwardly, will cause the transmission of forces, indicated by the additional arrows 42, 43 and 44, 45 in Fig. 3C, also radially in both directions, thus further increasing the sealing pressures between the inner and outer walls of the sealing device and the rotating element and the outer wall of the bearing casing. Thus effective sealing is accomplished between the tubular member 15 and the rotating element 10 and bearing casing 11.

If further internal pressure is desired over and above that which has been effected by providing a larger original cross-sectional area of sealing device 15 than the area between the interior of the bearing casing and the rotating element, provision may be made for connecting the hollow interior of the tubular member with a source of fluid pressure. Thus, for instance, as shown in Figs. 1 and 4, an annular aperture 30 may be provided in the periphery of outer wall 17 which aperture may cooperate with any suitable aperture extending through the bearing casing 11 and fixture 12 to a source of fluid pressure.

Each of the walls of sealing device 15 is formed to perform a special individual function as well as a function in relation to the other walls. Thus, inner wall 16 is cast relatively thick, side walls 18 are of lesser thickness, while outer wall 17 is least thick. Wall 16 is formed thickest because it must stand the greatest wear due to the relative rotation of shaft 10 therein, and also because by casting this wall sufficiently thick, a single casting may be bored to fit shafts of various sizes within predetermined limits.

The side walls 18 are cast less thick than inner wall 16 in order that it may be sufficiently flexible to take up the vibrations of the shaft. At the same time walls 18 are sufficiently thick so that they will transmit the flexing stresses therein to the inner and outer walls, as shown in Fig. 3C.

The outer wall 17 is cast thinnest in order that it may readily conform to the contour of outer wall 20 of the bearing casing and form an effective seal.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

In a seal between a shaft and a casing, a U-shaped circular housing adapted to be secured to the casing, and a resilient packing ring disposed in the housing, the ring having an annular recess with a narrow entrance slot in its outer wall, the outer surface of the ring being slightly convex in its central portion and the outer diameter of the ring being slightly greater than the inner diameter of the housing, the inner diameter of the ring being slightly less than the diameter of the shaft, so that when the seal is inserted in the housing a slight pressure is developed on the elements of the outer wall of the ring whereby a slight lateral pressure is developed for holding the side walls of the ring in close engagement with the housing and for holding the inner surface of the ring in close engagement with the shaft.

WILLIAM MESSINGER.